United States Patent
Wang

(10) Patent No.: US 8,605,644 B2
(45) Date of Patent: Dec. 10, 2013

(54) TRANSMISSION POWER CONTROL FOR SOUNDING SIGNAL FOR WIRELESS NETWORKS

(75) Inventor: Shu-Shaw Wang, Arlington, TX (US)

(73) Assignee: Nokia Siemens Networks Oy, Espoo (FI)

(*) Notice: Subject to any disclaimer, the term of this patent is extended or adjusted under 35 U.S.C. 154(b) by 687 days.

(21) Appl. No.: 12/704,352

(22) Filed: Feb. 11, 2010

(65) Prior Publication Data

US 2010/0208608 A1 Aug. 19, 2010

Related U.S. Application Data

(60) Provisional application No. 61/152,217, filed on Feb. 12, 2009.

(51) Int. Cl.
  *H04B 7/185* (2006.01)
(52) U.S. Cl.
  USPC ........... 370/318; 370/203; 370/326; 370/328; 455/522; 455/452.2; 455/450; 455/509
(58) Field of Classification Search
  USPC ......... 370/252, 216, 230, 232, 233, 234, 235, 370/310, 328, 329, 330, 331.332, 333, 334, 370/311, 203, 326, 318; 455/436, 437, 438, 455/439, 442, 13.4, 522, 574
  See application file for complete search history.

(56) References Cited

U.S. PATENT DOCUMENTS

| | | | |
|---|---|---|---|
| 5,862,489 A * | 1/1999 | Aalto ........................... | 455/522 |
| 7,616,596 B2 * | 11/2009 | Lee et al. ..................... | 370/326 |
| 7,706,804 B2 * | 4/2010 | Huh et al. .................... | 455/450 |

(Continued)

FOREIGN PATENT DOCUMENTS

| WO | 2008086110 A3 | 9/2005 |
|---|---|---|
| WO | 2008057836 A2 | 5/2008 |
| WO | 2010046202 A1 | 9/2009 |

OTHER PUBLICATIONS

International Preliminary Report on Patentability received for International Patent Application No. PCT/EP2009/062571, mailed on Apr. 26, 2011, 7 pages.

(Continued)

*Primary Examiner* — Dady Chery
(74) *Attorney, Agent, or Firm* — Brake Hughes Bellenmann LLP

(57) ABSTRACT

In an example embodiment, an apparatus may include at least one processor and at least one memory including computer code. The at least one memory and the computer program code may be configured to, with the at least one processor, cause the apparatus to at least perform: receiving at a mobile station from a base station in a wireless network, a channel quality threshold and a power adjustment value; measuring a downlink channel quality associated with each of a plurality of resource blocks in a downlink direction from the base station; selecting one or more of the resource blocks that have a channel quality that is greater than or equal to the channel quality threshold; and performing the following for each of the selected one or more resource blocks: determining a transmission power for transmitting a sounding signal via the resource block based upon the measured downlink channel quality for the resource block and power adjustment value; and transmitting, via a wireless transceiver, the sounding signal in an uplink direction to the base station via the resource block using the determined transmission power for the resource block.

22 Claims, 7 Drawing Sheets

(56) References Cited

U.S. PATENT DOCUMENTS

| | | | |
|---|---|---|---|
| 7,711,386 B2* | 5/2010 | Sung et al. | 455/522 |
| 2005/0201296 A1 | 9/2005 | Vannithamby et al. | |
| 2005/0207367 A1 | 9/2005 | Onggosanusi et al. | |
| 2007/0189408 A1 | 8/2007 | Waxman | |
| 2007/0248147 A1 | 10/2007 | Tiirola et al. | |
| 2008/0039098 A1 | 2/2008 | Papasakellariou et al. | |
| 2008/0068980 A1 | 3/2008 | Lim et al. | |
| 2008/0123601 A1 | 5/2008 | Malladi et al. | |
| 2008/0233966 A1 | 9/2008 | Scheim et al. | |
| 2008/0253279 A1 | 10/2008 | Ma et al. | |
| 2008/0273494 A1 | 11/2008 | Vook et al. | |
| 2009/0028112 A1* | 1/2009 | Attar et al. | 370/332 |
| 2009/0046570 A1 | 2/2009 | Sarkar et al. | |
| 2009/0274226 A1 | 11/2009 | Mondal et al. | |
| 2010/0061311 A1 | 3/2010 | Wang et al. | |
| 2010/0061346 A1 | 3/2010 | Wang et al. | |
| 2011/0261806 A1 | 10/2011 | Chun et al. | |

OTHER PUBLICATIONS

Cudak, "IEEE 802.16m System Requirements", Motorola, IEEE 802.16 Broadband Wireless Access Working Group, IEEE 802.16m-07/002r4, Oct. 19, 2007, 26 pages.

Hsieh, et al, "Link Performance of WiMAX PUSC", IEEE Wireless Communications and Networking Conference, Motorola Inc., Mar. 31-Apr. 3, 2008, pp. 1143-1148.

"Considerations and Recommendations for UL Soundings RS", Motorola, 3GPP TSG RAN WG1 #49bis, Orlando, USA, Jun. 25-29, 2007, 6 pages.

"UL RS structure Issues with Frequency Domain CDM", Qualcomm Europe, 3GPP TSG-RAN WG1 #47-bis, R1-070432, Jan. 15-19, 2007, Sorrento, Italy, 10 pages.

"CDM RS for Demodulation and Channel Sounding", Qualcomm Europe, 3GPP TSG RAN1 #48bis, R1-071299, Mar. 26-30, 2007, St. Julian's, Malta, 7 pages.

Vook, et al, "Details of UL Channel Sounding Design for Section 11.9 of the SDD", IEEE 802.16 Broadband Wireless Access Working Group, IEEE 802.16m-08/943, Sep. 5, 2008, 12 pages.

Non-Final Office Action for U.S. Appl. No. 12/205,663, mailed on Jul. 11, 2011, 14 pages.

Non-Final Office Action for U.S. Appl. No. 12/211,289, mailed on Aug. 22, 2011, 37 pages.

"Proposed Text for the Draft P802.16m Amendment on the PHY Structure for UL Control", IEEE 802.16 Broadband Wireless Access Working Group, IEEE C802.16m-09/XXX (Jan. 2009), 65 pages.

Hamiti, S., "IEEE 802.16m System Description Document [Draft]", IEEE 802.16 Broadband Wireless Access Working Group, IEEE 802.16m-08/003r6 (Dec. 12, 2008), 163 pages.

Murias, R., "IEEE 802.16m Amendment Working Document", IEEE 802.16 Broadband Wireless Access Working Group, IEEE 802.16m-08/050 (Dec. 11, 2008), 31 pages.

Response to Non-Final Office Action filed for U.S. Appl. No. 12/205,663, filed on Jan. 11, 2012, 19 pages.

"MIMO", Wikipedia, the free encyclopedia, retrieved on Sep. 1, 2008, <http://en.wikipedia.org/wiki/MIMO>, 7 pages.

"Part 16: Air Interface for Fixed Broadband Wireless Access Systems", IEEE Standard for Local and Metropolitan area Networks, IEEE Computer Society and the IEEE Microwave Theory and Techniques Society, IEEE Std 802.16-2004, Oct. 1, 2004, pp. 1-893.

"Walsh code", Wikipedia, the free encyclopedia, Retrieved on Sep. 1, 2008, <http://en.wikipedia.org/wiki/Walsh_code>, 2 pages.

"WiMAX MIMO", Wikipedia, the free encyclopedia, retrieved on Sep. 1, 2008, <http://en.wikipedia.org/wiki/WiMAX_MIMO>, 7 pages.

Agarwal, Rajiv, et al., "Opportunistic Feedback Protocol for Achieving Sum-Capacity of the MIMO Broadcast Channel", IEEE 66th Conference on Vehicular Technology, Sep. 30, 2007-Oct. 3, 2007, pp. 606-610.

Ahmadi, Sassan, et al., "Proposed 802.16m Frame Structure Baseline Content Suitable for Use in the 802.16m SDD", IEEE 802.16 Broadband Wireless Access Working Group, Mar. 3, 2008, 13 pages.

"Part 11: Wireless LAN Medium Access Control (MAC) and Physical Layer (PHY) Specifications", IEEE Standard for Information Technology—Telecommunications and information exchange between systems—Local and metropolitan area networks—Specific requirements, IEEE Computer Society, IEEE Std. 802.11-2007, Jun. 12, 2007, pp. 1-1232.

"Part 16: Air Interface for Fixed and Mobile Broadband Wireless Access Systems", Amendment 2: Physical and Medium Access Control Layers for Combined Fixed and Mobile Operation in Licensed Bands and Corrigendum 1, EEE Computer Society and the IEEE Microwave Theory and Techniques Society, IEEE Std. 802.16e 2005, Feb. 28, 2006, pp. 1-864.

Kang, Tae-Sung, et al., "Opportunistic Feedback Assisted Scheduling and Resource Allocation in OFDMA Systems", IEEE, ICCS, Oct. 2006, 5 pages.

Sutskover, Ilan, et al., "PN Sequences for Uplink Channel Sounding for TDD OFDMA", Intel Corporation, IEEE 802.16 Broadband Wireless Access Working Group, Aug. 27, 2004, 4 pages.

Vook, Fred, et al., "Uplink Channel Sounding for Enabling Closed-Loop Transmit Antenna Array Techniques in IEEE 802.22", Motorola Labs, IEEE P802.22 Wireless RANs, Jan. 18, 2006, 14 pages.

U.S. Appl. No. 13/125,103 Non-Final Office Action mailed Apr. 10, 2013, 19 pages.

* cited by examiner

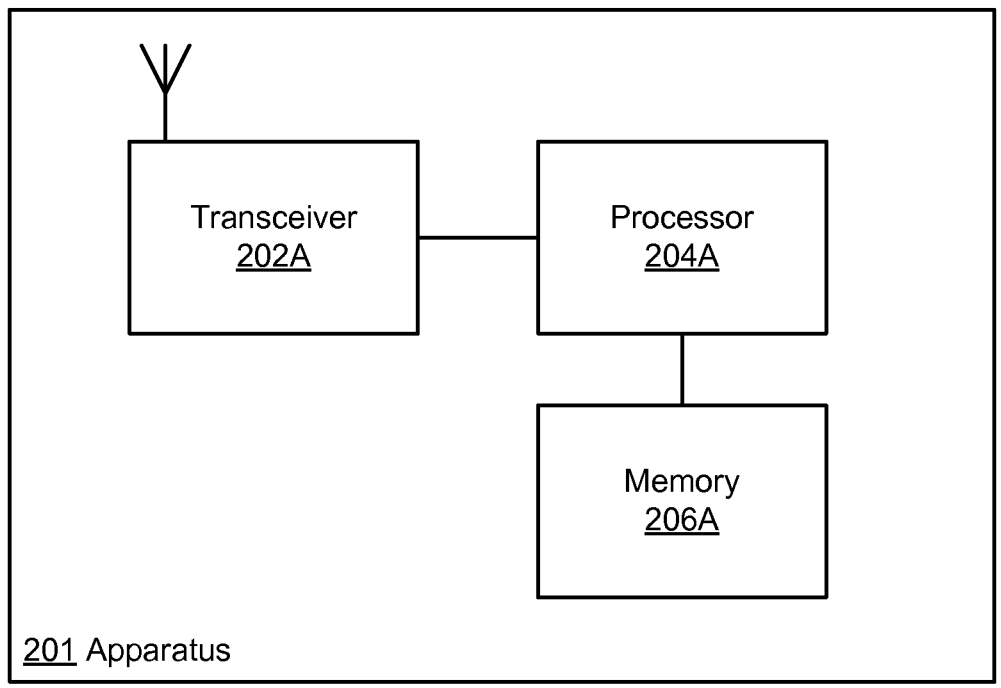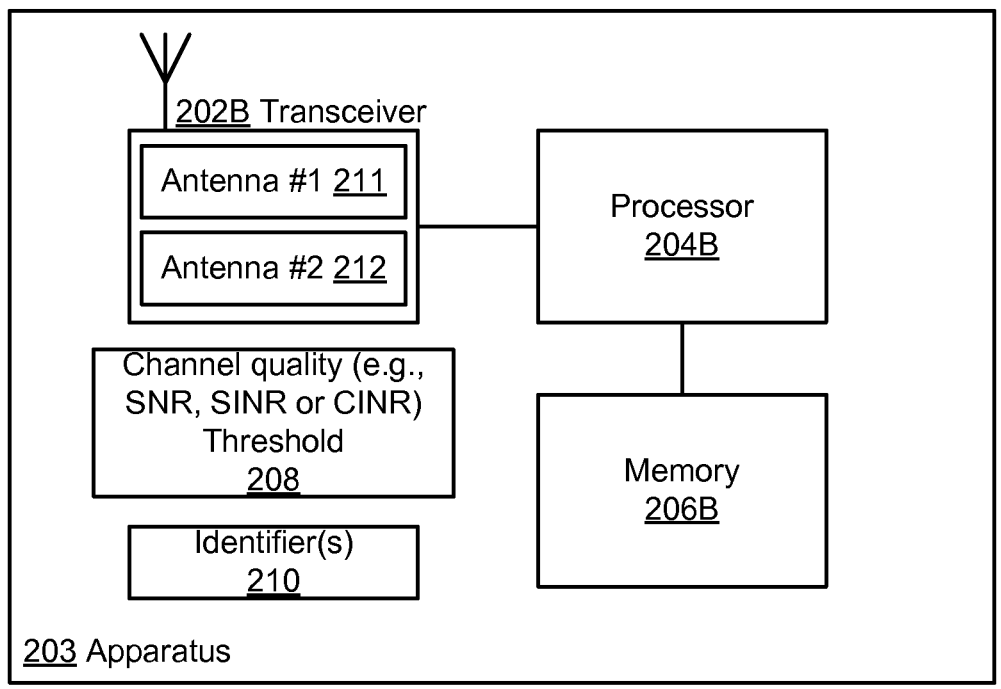
FIG. 2

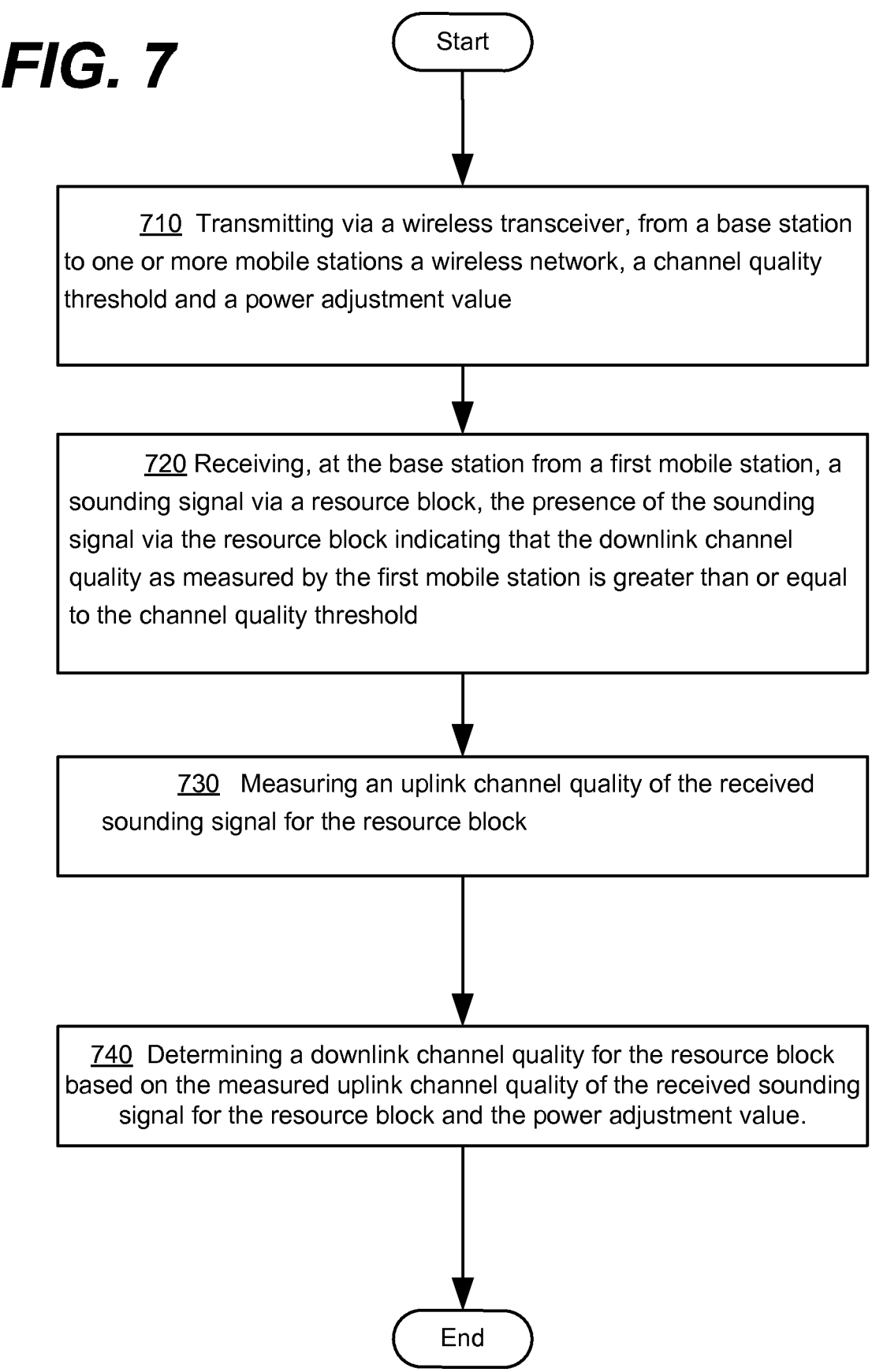

TRANSMISSION POWER CONTROL FOR SOUNDING SIGNAL FOR WIRELESS NETWORKS

PRIORITY CLAIM

This Application claims the benefit of priority based on U.S. Provisional Application No. 61/152,217, filed Feb. 12, 2009, entitled, "Transmission Power Control for Sounding Signal for Wireless Networks," the disclosure of which is hereby incorporated by reference.

BACKGROUND

Worldwide Interoperability for Microwave Access (WiMAX) is a telecommunications technology often aimed at providing wireless data over long distances (e.g., kilometers) in a variety of ways, from point-to-point links to full mobile cellular type access. A network based upon WiMAX is occasionally also called a Wireless Metropolitan Access Network (WirelessMAN or WMAN); although, it is understood that WMANs may include protocols other than WiMAX. WiMAX often includes a network that is substantially in compliance with the IEEE 802.16 standards, their derivatives, or predecessors (hereafter, "the 802.16 standard"). Institute of Electrical and Electronics Engineers, *IEEE Standard for Local and Metropolitan Area Networks, Part 16*, IEEE Std. 802.16-2004.

One particular derivative of the 802.16 standard is the, as yet finished, 802.16m standard that attempts to increase the data rate of wireless transmissions to 1 Gbps while maintaining backwards compatibility with older networks. IEEE 802.16 Broadband Wireless Access Working Group, *IEEE 802.16m System Requirements*, Oct. 19, 2007.

Wireless Local Area Network (WLAN) is a telecommunications technology often aimed at providing wireless data over shorter distances (e.g., meters or tens of meters) in a variety of ways, from point-to-point links to full mobile cellular type access. A network based upon the WLAN standard is occasionally also referred to by the common or marketing name "WiFi" (or "Wi-Fi") from Wireless Fidelity; although it is understood that WLAN may include other shorter ranged technologies. WiFi often includes a network that is substantially in compliance with the IEEE 802.11 standards, their derivatives, or predecessors (hereafter, "the 802.11 standard").

SUMMARY

According to one general aspect, a method may include receiving at a mobile station from a base station in a wireless network, a channel quality threshold and a power adjustment value; measuring a downlink channel quality associated with each of a plurality of resource blocks in a downlink direction from the base station; selecting one or more of the resource blocks that have a channel quality that is greater than or equal to the channel quality threshold; and performing the following for each of the selected one or more resource blocks: determining a transmission power for transmitting a sounding signal via the resource block based upon the measured downlink channel quality for the resource block and power adjustment value; and transmitting the sounding signal in an uplink direction to the base station via the resource block using the determined transmission power for the resource block.

In an example embodiment, an apparatus may include at least one processor and at least one memory including computer program code. The at least one memory and the computer program code may be configured to, with the at least one processor, cause the apparatus to perform: receiving at a mobile station from a base station in a wireless network, a channel quality threshold and a power adjustment value; measuring a downlink channel quality associated with each of a plurality of resource blocks in a downlink direction from the base station; selecting one or more of the resource blocks that have a channel quality that is greater than or equal to the channel quality threshold; and performing the following for each of the selected one or more resource blocks: determining a transmission power for transmitting a sounding signal via the resource block based upon the measured downlink channel quality for the resource block and power adjustment value; and transmitting, via a wireless transceiver, the sounding signal in an uplink direction to the base station via the resource block using the determined transmission power for the resource block.

In an example embodiment, a method may include transmitting via a wireless transceiver, from a base station to one or more mobile stations a wireless network, a channel quality threshold and a power adjustment value; receiving, at the base station from a first mobile station, a sounding signal via a resource block, the presence of the sounding signal via the resource block indicating that the downlink channel quality as measured by the first mobile station is greater than or equal to the channel quality threshold; measuring an uplink channel quality of the received sounding signal for the resource block; and determining a downlink channel quality for the resource block based on the measured uplink channel quality of the received sounding signal for the resource block and the power adjustment value.

According to another example embodiment, an apparatus may include at least one processor and at least one memory including computer program code, the at least one memory and the computer program code being configured to, with the at least one processor, cause the apparatus to at least perform: transmitting via a wireless transceiver, from a base station to one or more mobile stations in a wireless network, a channel quality threshold and a power adjustment value; receiving, at the base station from a first mobile station, a sounding signal via a resource block, the presence of the sounding signal via the resource block indicating that the downlink channel quality as measured by the first mobile station is greater than or equal to the channel quality threshold; measuring an uplink channel quality of the received sounding signal for the resource block; and determining a downlink channel quality for the resource block based on the measured uplink channel quality of the received sounding signal for the resource block and the power adjustment value.

The details of one or more implementations are set forth in the accompanying drawings and the description below. Other features will be apparent from the description and drawings, and from the claims.

An apparatus, system, and/or method for communicating information, substantially as shown in and/or described in connection with at least one of the figures, as set forth more completely in the claims.

BRIEF DESCRIPTION OF THE DRAWINGS

FIG. 2 is a block diagram of an example embodiment of an apparatus in accordance with the disclosed subject matter.

FIG. 7 is a flowchart illustrating operation of a base station according to an example embodiment.

DETAILED DESCRIPTION

Figure 1:
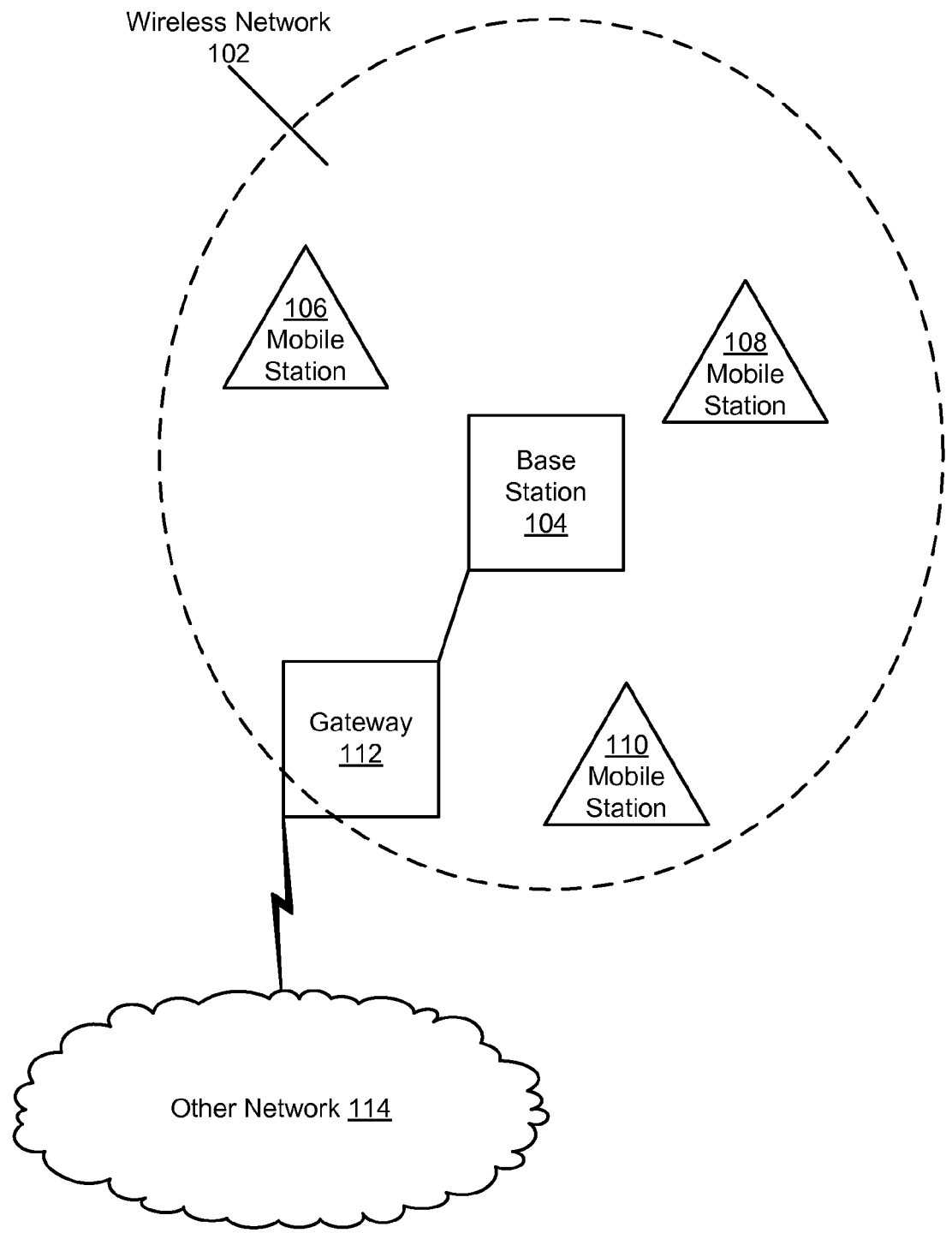
FIG. 1 is a block diagram of an example embodiment of a system in accordance with the disclosed subject matter.

Referring to the Figures in which like numerals indicate like elements, FIG. 1 is a block diagram of a wireless network 102 including a base station (BS) 104 and mobile stations (MSs) 106, 108, 110, according to an example embodiment. Each of the MSs 106, 108, 110 may be associated with BS 104, and may transmit data in an uplink direction to BS 104, and may receive data in a downlink direction from BS 104, for example. Although only one BS 104 and three mobile stations (MSs 106, 108 and 110) are shown, any number of base stations and mobile stations may be provided in network 102. Also, although not shown, mobile stations 106, 108 and 110 may be coupled to base station 104 via relay stations or relay nodes, for example. The base station 104 may be connected via wired or wireless links to another network (not shown), such as a Local Area Network, a Wide Area Network (WAN), the Internet, etc. In various embodiments, the base station 104 may be coupled or connected with the other network 120 via an access network controller (ASN) or gateway (GW) 112 that may control, monitor, or limit access to the other network.

FIG. 2 is a block diagram of two example embodiments of apparatuses 201 and 203 in accordance with the disclosed subject matter. In one embodiment, the apparatus 201 may include a communications device such as a base station (BS) or a mobile station (MS) such as that illustrated in FIG. 1. In one embodiment, the apparatus 201 may include a transceiver 202A to transmit and receive signals, a processor 204S to provide overall control, execute instructions or software, and a memory 206S. In some embodiments, the transceiver 202S may include a wireless transceiver configured to operate based upon a wireless networking standard (e.g., WiMAX, WiFi, WLAN, etc.). The transceiver 202A may include, for example, a baseband processor and/or a Physical interface or PHY. In other embodiments, the transceiver 202S may include a wired transceiver configured to operate based upon a wired networking standard (e.g., Ethernet, etc.). In various embodiments, the controller 204A may include a processor. In various embodiments, the memory 206A may include permanent (e.g., compact disc, etc.), semi-permanent (e.g., a hard drive, etc.), and/or temporary (e.g., volatile random access memory, etc.) memory. For example, some operations illustrated and/or described herein, may be performed by a processor (or controller) 204A, under control of software, firmware, or a combination thereof. In another example, some components illustrated and/or described herein, may be stored in memory 206A.

FIG. 2 is also a block diagram of an apparatus 203 in accordance with an example embodiment of the disclosed subject matter. In one embodiment, the apparatus 203 may include a communications device such as a base station (BS) or a mobile station (MS) such as that illustrated in FIG. 1. In one embodiment, the apparatus 203 may include a wireless transceiver 202B, a controller 204B, and a memory 206B. In some embodiments, the transceiver 202B may include a wireless transceiver configured to operate based upon a wireless networking standard (e.g., WiMAX, WiFi, WLAN, etc.). In other embodiments, the transceiver 202B may include a wired transceiver configured to operate based upon a wired networking standard (e.g., Ethernet, etc.). Processor 204B may also be referred to as a controller. In various embodiments, the transceiver 202B may include a plurality of antennas, such as antenna #1 211 and antenna #2 212. In one embodiment, the apparatus 203 may include a channel quality threshold 208. In various embodiments, the channel quality threshold 208 may be stored by the memory 206B. In some embodiments, the apparatus 203 may include at least one identifier 210 configured to substantially uniquely identify each antenna (e.g., antennas 211 and 212). In various embodiments, the identifier 210 may be stored by the memory 206B.

Figure 3:
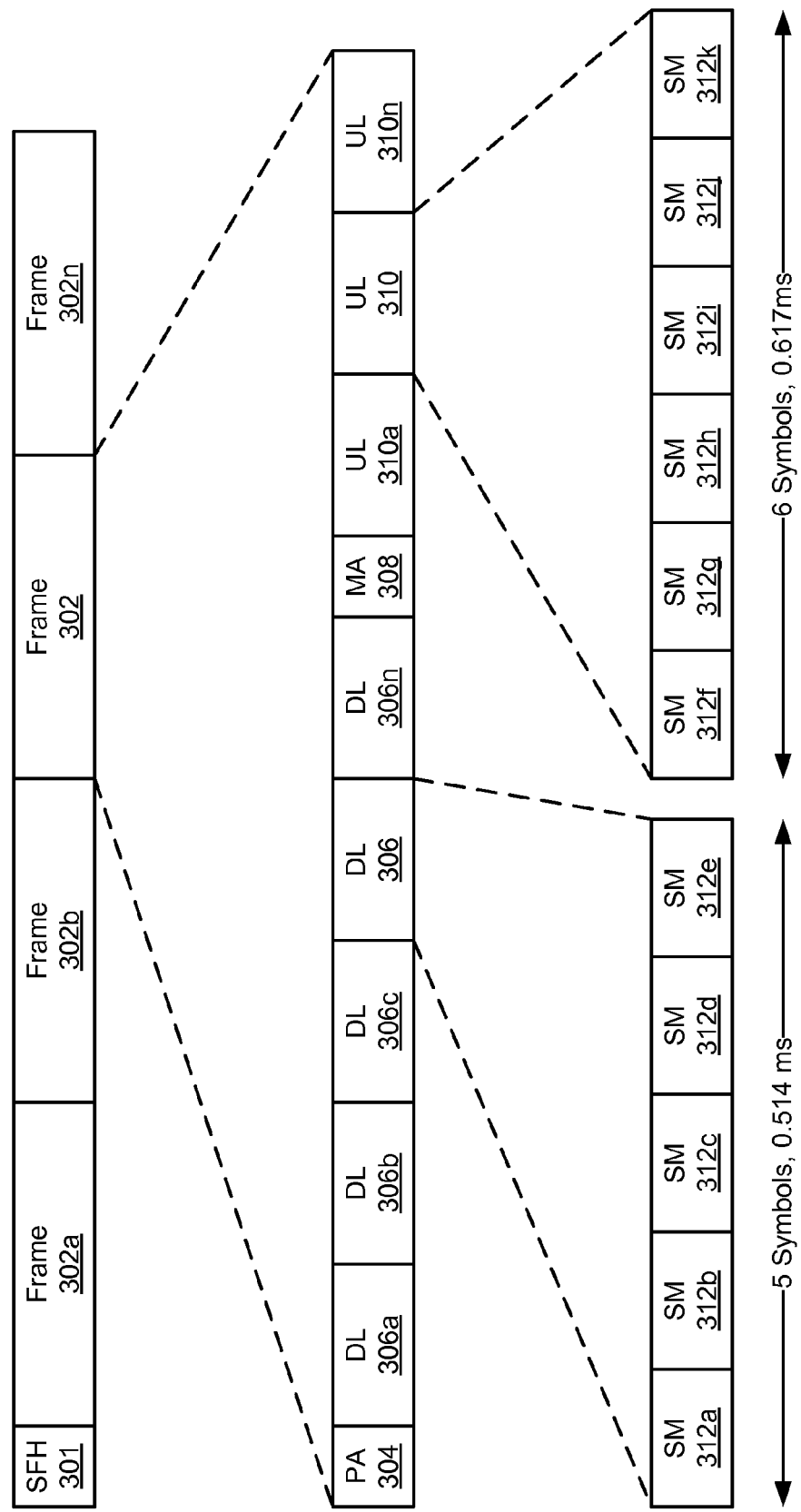
FIG. 3 is a block diagram of an example embodiment of a series of frames in accordance with the disclosed subject matter.

FIG. 3 is a block diagram of an example embodiment of a series of frames in accordance with the disclosed subject matter. In one embodiment, the base station and various mobile stations may communicate with each other using a series or plurality of frames or super-frame 300.

These frames may be transmitted over or via a communications channel. The following provides an overall context of the communications channel. In this context, a communications channel may include a medium used to convey information from a sender to a receiver. FIG. 3 illustrates the division of the communications channel as a function of time (e.g., time division multiplexing). In addition, a communications channel may also be divided as a function of frequency, illustrated more completely in FIG. 5. In various embodiments, this communications channel may include a plurality of frequencies or a bandwidth of frequencies. This bandwidth may be sub-divided into sub-channels or sub-carriers. Each of these sub-carriers may include their own respective bandwidth. In various embodiments, these sub-carriers may generally be of equal size.

In various embodiments, the communications channel may be divided by both time and frequency into resource blocks. In such an embodiment, a resource block may include a given sub-channel or sub-channels for a period of time. These resource blocks may provide the fundamental blocks of communication. In this context, a resource band may be the frequency and time based component of a resource block and include the sub-channels comprising a resource block. According to an example embodiment, a resource block may include a group of subcarriers, such as 18 subcarriers (as an example), or any number of subcarriers. Or, for example, a resource block may include 18 subcarriers by 6 Orthogonal Frequency Division Multiplexing (OFDM) symbols. These are merely examples, and a resource block may include other numbers of subcarriers and/or symbols.

A controlling device (e.g., a base station), in one embodiment, may allocate resource blocks among mobile devices. In such an embodiment, the base station may attempt to perform this allocation in such a way as to reduce the number of un-received or un-usable (e.g., garbled, noise ridden, etc.) transmissions. In various embodiments, it may not be possible to make use of every possible resource block or resource band.

FIG. 3 illustrates a plurality of frames. In various embodiments, the plurality of frames may be organized into a super-frame 300. In one embodiment, this super-frame 300 may include a super-frame header 301 and frames 302a, 302b, 302, and 302n. Frame 302 may include a down-link (DL) portion and an uplink (UL) portion. In various embodiments, a DL sub-frame 306 may be reserved for communication from the base station to a mobile station. Conversely, an UL sub-frame 310 may be reserved for communication from the mobile station to the base station. Downlink (DL) may refer to a direction of transmission from base station to a mobile station, and uplink (UL) may refer to a direction of transmission from a mobile station to a base station.

In one embodiment, a frame 302 may include a pre-amble 304, a plurality of DL sub-frames (e.g., DL sub-frames 306a, 306b, 306c, 306, and 306n), a mid-amble 308, and a plurality of UL sub-frames (e.g., UL sub-frames 310a, 310, and 310n). In various embodiments, the mid-amble 308 and pre-amble 304 may, respectively, delineate the transition between the DL and UL portions of the frame 302 and between frames themselves. In one embodiment, the pre-amble 304 and mid-amble 308 may include a signal that is broadcast to any listening devices (e.g., mobile stations) within the range of the base station or other transmitting device.

Conversely, a DL sub-frame 306 or UL sub-frame 310 may include messages generally intended for a specific receiver or group of receivers. Occasionally these sub-frames may be used to broadcast information (e.g., resource allocation, channel condition feedback, etc.). These time based sub-frames may be, in one embodiment, additionally divided by frequency into the resource blocks (not shown) which are allocated to mobile stations to either receive or send information. In such an embodiment, the sub-frame may be the practical time division of the communications channel.

In various embodiments, the DL sub-frame 306 may include a plurality of symbols 312. In one specific embodiment, the DL sub-frame 306 may include five symbols 312a-e and duration of approximately 0.514 ms. In various embodiments, the UL sub-frame 310 may include a plurality of symbols 312f-k. In one specific embodiment, the UL sub-frame 310 may include six symbols 312f-k and duration of approximately 0.617 ms. In various embodiments, these symbols 312a-k are orthogonal frequency-division multiple access (OFDMA) symbols. In one embodiment, an UL resource block may include a resource band or bandwidth of 18 sub-carriers, and a time duration or length of six symbols 312f-k. In various embodiments, a resource block size may be configurable or predefined. It is understood that the above are merely a few illustrative examples to which the disclosed subject matter is not limited.

Figure 4:
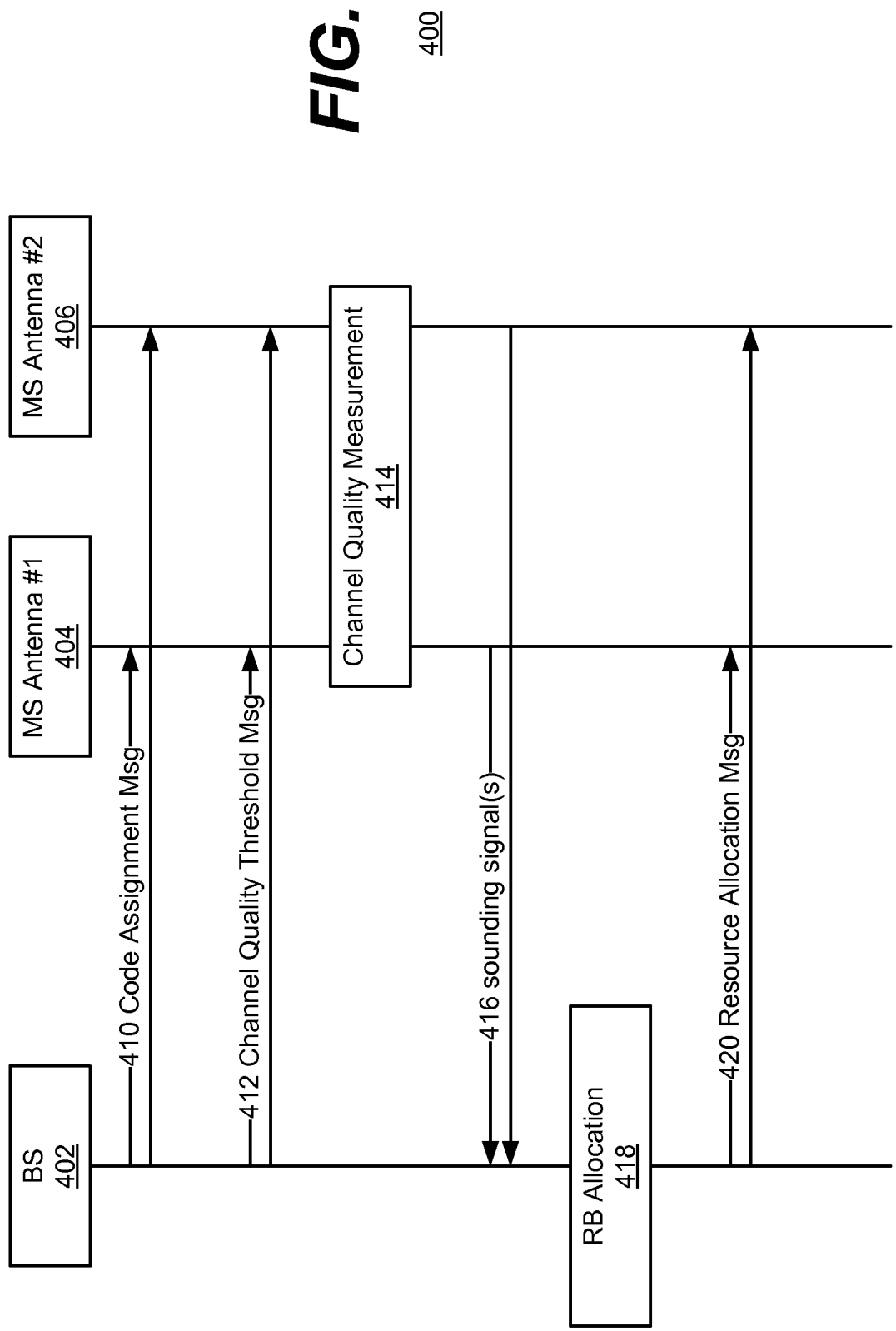
FIG. 4 is a block diagram of an example embodiment of a system in accordance with the disclosed subject matter.

FIG. 4 is a block diagram of an example embodiment of a system 400 in accordance with the disclosed subject matter. In one embodiment, the system 400 may include a BS 402, and a mobile station. In various embodiments, the mobile station may include a first antenna 404 and a second antenna 406. However, it is understood that the disclosed subject matter is not limited to a fixed number of antennas and that FIG. 4 is merely an illustrative embodiment, as the subject matter of this application may apply to systems having one antenna or to systems having more than one antenna.

In one embodiment, the BS 402 may establish an association or a connection with at least one mobile station, as described above. In various embodiments, this establishment may include broadcasting a message identifying the BS 402, receiving a message from the MS requesting an association, and authenticating the MS; although, it is understood that the above is merely one illustrative example to which the disclosed subject matter is not limited.

In one embodiment, the BS 402 may broadcast or individually transmit a code assignment message 410 to a MS or each MS antenna 404 and 406. In various embodiments, this code assignment message 410 may include an assignment of a substantially unique identifier or code to the mobile station or to each antenna (e.g., MS antennas 404 and 406). In such an embodiment, this code may be used to identify from which antenna a sounding signal originates, as described below. Alternatively, the unique code or identifier may be assigned to a mobile station, e.g., a different identifier to each mobile station in the network which may allow the BS to identify from which mobile station a transmitted sounding signal originates.

In one embodiment, the BS 402 may transmit a message, which may be referred to as a channel quality threshold message 412, to at least one mobile station actively associated with the base station. The channel quality threshold message 412 may include (or may identify) a channel quality threshold. A variety of different types of channel quality may be used or may be identified, such as signal-to-noise ratio, a signal-to-interference and noise ratio, carrier-to-interference and noise ratio (CINR), or any other channel quality. In various embodiments, a MS may temporarily go inactive or otherwise leave the network including the BS. In various embodiments, these MSs may not receive the channel quality threshold message 412. In various embodiments, the BS 402 may broadcast this channel quality threshold message 412.

As an example channel quality, a SNR may be defined, for example, as the ratio of an average signal power to the noise power corrupting the signal. In various embodiments, a signal-to-noise ratio compares the strength of a desired signal (e.g., data communication) to the strength of background noise. In general, the higher the ratio, the less obtrusive the background noise is and, therefore, the more likely it is that information (i.e., the signal) may be transmitted without errors. CINR and SINR may similarly represent or indicate a quality of a signal, as additional examples. Other channel qualities may be used.

In one embodiment, the BS 402 may determine a channel quality threshold below which the BS 402 has determined that communication is not worthwhile or desirable, for example. In various embodiments, this channel quality threshold level may be predetermined. In another embodiment, this channel quality threshold level may be configurable (e.g., via a network administration server, during BS 402 provisioning configuration, etc.). In yet another embodiment, this channel quality threshold (e.g., SNR threshold) may be dynamically adjustable. In one embodiment, the BS 402 may not receive an acceptable response from the MSs, as described below. In such an embodiment, the BS 402 may lower the channel quality (e.g., SNR or CINR) threshold until a minimum value is reached or the BS 402 is satisfied with the MSs' responses. In various embodiments, the definition of what level of response the BS 402 considers acceptable may be predefined, configurable, dynamically adjustable or a combination thereof. In various embodiments, this level of acceptability may be in terms of quantity of response or in terms of final allocation options, as described below.

Block 414 illustrates that, in one embodiment, upon receipt of the broadcast channel quality threshold message 412, the MSs or their antennas (e.g., MS antennas 404 and 406) may measure the channel quality of some or all of the sub-carriers or resource bands of the communications channel. In various embodiments, measuring the channel quality of some or all of the sub-carriers may include measuring the channel quality (e.g., SNR, SINR, CINR or other channel quality) of the resource block or resource band used to transmit the broadcast channel quality threshold message 412. In some embodiments, the SNR or CINR may be measured for each antenna (e.g., MS antennas 404 and 406). In another embodiment, the channel quality may be measured at one antenna or an average of all antennas may be computed for the MS.

In an example embodiment, a MS may measure a channel quality by measuring a channel quality of each of a plurality of resource blocks in a downlink direction, e.g., by the MS measuring an average channel quality for each resource block. For example, a resource block may be a group of subcarriers, and the mobile station may measure a channel quality (e.g., CINR or SNR or SINR) for a resource block by measuring the average channel quality for each resource block. For example, the MS may measure an average channel quality for a resource block by determining an average channel quality across a group of subcarriers, where the resource block may include the group of subcarriers. Other techniques may be used to measure a channel quality for a resource block.

In an example embodiment, each mobile station may receive one or more signals on each of a plurality of resource blocks in a downlink direction, where the one or more signals may include one or more of a preamble, a midamble and/or a pilot subcarrier signal transmitted by the base station. Each mobile station may measure the channel quality of the received downlink signal(s) for each of one or more resource blocks. For example, each mobile station may measure a channel quality of a received signal(s) for each group of subcarriers. Each mobile station may then compare the channel quality of each measured resource block to the channel quality threshold, and may, for example, select one or more resource blocks having a channel quality that is greater than or equal to the channel quality threshold identified by message 412.

In an example embodiment, each MS may then transmit, in an uplink direction to the BS, a sounding signal at 416. The presence of the sounding signal may identify the selected one or more resource blocks that have a measured downlink channel quality, as measured by the MS, that is greater than or equal to the channel quality threshold. Thus, for example, the sounding signal may be transmitted in an uplink direction on resource blocks (or on one or more subcarriers of the resource blocks) that have a measured channel quality in a downlink direction that was greater than or equal to a threshold, for example. In an example embodiment, the sounding signal may be a signal that identifies one or more resource blocks by providing the sounding signal on such identified resource blocks. In an example embodiment, the sounding signal may be transmitted on only one subcarrier of a resource block, or may be transmitted on each of a plurality of subcarriers of a resource block. Thus, the sounding signal may, for example, provide a preselected pattern, e.g., a 1 or all ones (1s), or other signal pattern, on one or more subcarriers within one or more resource blocks, e.g., where the presence of the sounding signal on a subcarrier(s) of a resource block may identify the selected group of resource blocks as having a channel quality that is greater than (or alternatively that is greater than or equal to) the channel quality threshold. In this example embodiment, the sounding signal may identify resource blocks that have a downlink measured channel quality that exceeds a threshold, e.g., the sounding signal may be transmitted on (e.g., only on) those resource blocks (or transmitted on one or more subcarriers of those resource blocks) having a measured channel quality that is greater than or equal to the channel quality threshold, for example. Thus, in this manner, each MS may (e.g., implicitly) identify one or more resource blocks by transmitting a sounding signal on (or within at least one subcarrier of) each of the identified resource blocks.

According to an example embodiment, it is not necessary for a MS to transmit the sounding signal on all subcarriers of a resource block, rather a sounding signal may be transmitted on only one (or a subset, e.g., three) subcarriers of the resource block, and in this manner, the sounding signal may identify the entire resource block as having (e.g., an average) channel quality that is greater than or equal to the channel quality threshold. In an example embodiment, it may be more efficient to transmit a simple sounding signal on each resource block (or subcarrier or group of subcarriers) having a downlink channel quality that exceeds a threshold, rather than transmitting, e.g., a packet or frame that includes a bit or bits that identifies each selected resource block that has a channel quality that is greater than or equal to the channel quality threshold.

Also, in another example embodiment, the measurement of channel quality of each resource block and sending a sounding signal at 416, may be performed for each antenna of the (or each) mobile station.

In one example embodiment, each MS may be assigned by the BS a different subcarrier(s) to transmit a sounding signal. Thus, based on this subcarrier assignment for sounding signal, each MS may use a different subcarrier to transmit a sounding signal within a resource block, e.g., subcarrier 1 is used by MS1, subcarrier 2 is used by MS2, . . . subcarrier 18 is used by MS18 to transmit the sounding signal to the BS. In this manner, the subcarrier on which a sounding signal is received within a resource block may be used by a BS to identify the MS that transmitted the sounding signal(s).

Alternatively, in another example embodiment, each MS (or antenna) may be assigned a unique code, such as a different orthogonal Code Division Multiple Access (CDMA) code via code assignment message 410. Each MS (or each antenna in a multiple antenna embodiment) may encode a corresponding sounding signal using the orthogonal CDMA code assigned to the MS, for example, to generate an encoded sounding signal on the selected resource blocks having a channel quality that is greater than or equal to the threshold. Thus, the presence of the sounding signal on one or more resource blocks may identify resource blocks having a channel quality that exceeds the threshold, and the encoding of the sounding signal using the orthogonal code may be used to identify the transmitting MS or transmitting antenna.

In such an embodiment, the BS 402 may receive a plurality of sounding signals at 416 via a plurality of resource blocks, and which may be from different MSs. In various embodiments, the BS 402 may determine which resource blocks or resource bands experience a sufficient (e.g., as defined by the channel quality threshold) channel quality and are therefore considered "good" or acceptable resources for the reporting MS, for example.

Block 418 illustrates that, in one embodiment, the BS 402 may perform resource block (RB) allocation based in part upon the received sounding signals at 416. In various embodiments, this RB allocation 418 may include RB allocation for MSs during both a DL sub-frame portion and/or an UL sub-frame portion. In various embodiments, a RB allocation message 420 may occur during the normal resource block allocation of the next or subsequent frame. For example, a BS may allocate one or more resource blocks to a MS in either an UL or DL direction, based on the sounding signal received from the MS. For example, the BS may allocate one or more resource blocks to a MS corresponding to the resource blocks used to transmit the sounding signal. For example, due to symmetry in uplink and downlink channels, a subcarrier or group of subcarriers having a good channel quality as measured by a MS in a downlink direction may also typically have a good channel quality in the uplink direction, for example. Thus, resource blocks identified by a sounding signal from a reporting (or transmitting) MS may be assigned to the reporting MS for either UL transmission from the MS or DL transmission to the MS, as an example.

In some cases, a BS may receive sounding signals for the same resource block(s) from different MSs. This may mean, for example, that each of the reporting MSs measured a downlink channel quality for the resource block as greater than or equal to the channel quality threshold. The BS may then allocate this resource block to one of the reporting MSs. However, the mere presence of the sounding signal, at least in some cases, may only identify that the downlink channel quality as measured by the MS was greater than or equal to the threshold, but may not indicate the value of the measured downlink channel quality. Thus, without some information that may indicate at least an approximation of the measured downlink channel quality of a resource block, the BS may randomly pick one of the reporting MSs to receive the resource block.

Therefore, according to an example embodiment, a MS may use transmission power control for an uplink sounding signal for a resource block to communicate to the BS the measured downlink channel quality for the resource block. For example, the uplink transmission power used by a MS to transmit a sounding signal for a resource block may be varied based on the measured downlink channel quality for the resource block. According to an example embodiment, the measured channel quality of a sounding signal, as measured by the BS, may be used to determine (or estimate) the measured downlink channel quality for the resource block as measured by the MS. For example, the measured uplink channel quality as measured by the BS may be proportional to the measured downlink channel quality as measured by the MS, and the MS may adjust the transmission power of the sounding signal to accomplish this.

For example, in a simple case, a MS may adjust its transmission power for transmitting a sounding signal to cause the target or estimated uplink channel quality for the sounding signal, as measured by the BS, to be the same (or approximately the same) as the measured downlink channel quality for the resource block. Or, the transmission power may be adjusted so that the estimated or target uplink channel quality for the sounding signal (as measured by the BS) is a function of the measured downlink channel quality for the resource block (as measured by the MS). Thus, according to an example embodiment, a MS may adjust or determine a transmission power for a sounding signal based on the measured downlink channel quality for the resource block. Likewise, a BS may determine or estimate the measured downlink channel quality (as measured by the transmitting MS) for a resource block based on the measured uplink channel quality of the received sounding signal via the resource block.

According to an example embodiment, a MS may determine or calculate a transmission power for transmitting a sounding signal for a resource block, e.g., based on the measured downlink channel quality for the resource block. In one example embodiment, the measured uplink channel quality of a sounding signal of a resource block as measured by a BS may indicate or reflect the measured downlink channel quality for the resource block (as measured by the MS).

The target sounding channel quality to be received at the base station may be based upon the following (as an example):

$$\text{target UL sounding channel quality} = \text{measured downlink channel quality}/\alpha. \quad \text{(Eqn. 1)}$$

where target UL sounding channel quality is the target or estimate of the channel quality of the sounding signal for a resource block that will be received (and measured) by the BS, the measured downlink channel quality is the measured downlink channel quality as measured by the MS for the resource block, and $\alpha$ is a power adjustment factor. If the power adjustment factor ($\alpha$) is set to 1, then the target (or estimated) UL sounding channel quality will be the same as the measured downlink channel quality for the resource block. Setting the power adjustment factor to a value greater than 1 will attenuate or decrease the transmission power of the sounding signal, e.g., such that the target (or estimated) UL sounding channel quality will be less than the measured downlink channel quality for the resource block. For example, $\alpha=2$ may be used to set the target UL sounding channel quality (for the UL sounding signal) to be half of the measured downlink channel quality for the same resource block. Similarly, $\alpha$ may be set to a value less than 1 to increase the target UL sounding channel quality. The power adjustment value may be linear, a piece-wise linear or non-linear function with respect to a channel quality or CINR value, such as the downlink channel quality.

If the channel quality is specified, for example, as CINR, then target UL sounding channel quality may be determined based on:

$$\text{CINR}_{target} = \text{DL CINR Measurement}/\alpha. \quad \text{(Eqn. 2)}$$

where $\text{CINR}_{target}$ is the target sounding channel quality (target sounding channel CINR) to be received at the base station, DL CINR measurement is the measured downlink channel quality for the resource block, and $\alpha$ is the power adjustment value.

A BS may broadcast a channel quality threshold and a power adjustment factor ($\alpha$) per (or for each) frequency partition. For example, a frequency partition may include N resource blocks, where N may be any number.

To determine a transmission power for transmitting a sounding signal, a number of losses may be accounted for by the MS, e.g., in order to determine a transmission power that may be used to transmit a sounding signal that will have the desired or target channel quality as measured by the BS. For example, a transmission power for transmitting a sounding signal via the resource block may be determined based upon the target sounding channel quality, a path loss for a wireless communication path between the BS and MS, and the uplink noise and interference (NI) level. Other losses may also be accounted for.

For example, a BS may transmit or broadcast the uplink noise and interference (NI) level, which may include, for example, an estimate of the noise and interference from one or more adjacent MSs. The NI level may be provided generally, or may be provided for each resource block, or for other group of resources.

The BS may also broadcast its radiated power level, which may be, for example, its effective isotropic radiated power (EIRP) level. A MS may determine a received signal strength (RSS) of either a preamble, midamble or pilot carrier received from the BS, e.g., via the resource block. For example, the MS may add the energy or signal strength for a group or even all of the subcarriers, e.g., 18 subcarriers, and divide the total signal strength by the number of subcarriers to determine an average RSS per subcarrier for the resource block. The MS may then determine the path loss, for example, as the difference between BS radiated power level and the received signal strength for a resource block. This may be repeated for each resource block, since the path loss for each resource block may be different. Also, the path loss for a same resource block may be different for different MSs because the MSs may be located at different distances from the BS, e.g., RSS for a nearby MS may be higher than for a MS that is farther away from the BS.

According to an example embodiment, a MS may determine the transmission power per subcarrier for the sounding signal based upon the following:

$$P_{TX} = \text{PL} + \text{CINR}_{target} + \text{UL NI}. \quad \text{(Eqn. 3)}$$

where $P_{TX}$ is the transmission power per subcarrier for the resource block, PL is the path loss between the mobile station and the base station, and UL NI is the uplink noise and interference level per subcarrier (e.g., which may be transmitted or broadcast by the BS to the MS).

In another example embodiment, the power per subcarrier may be determined for transmission of the UL sounding signal based on the following.

$$P_{TX}(\text{dBm}) = PL + CINR_{target}NI + \text{Offset\_AMS}_{perAMS} + \text{Offset\_ABS}_{perAMS} \quad \text{(Eqn. 4)}$$

where $P_{TX\,(dBm)}$ is the transmit power per subcarrier, PL is the estimated average pathloss, $CINR_{target}$ is the target sounding CINR received at the BS, NI is the estimated average power level (dBm) of the noise and interference per subcarrier at the BS (uplink NI), $\text{Offset\_AMS}_{perAMS}$ is the correction term for AMS-specific power offset controlled by AMS, $\text{Offset\_ABS}_{perAMS}$ is the correction term for AMS-specific power offset controlled by ABS. The last two terms of Eqn. 4 may reflect losses due to connectors, cables, etc., or other losses.

In Eqn. (4), $CINR_{target}$ is the sounding signal target CINR, which may be set based upon the DL CINR measurement of the MS per mini-band (e.g., a resource block having 1 resource unit, where a resource unit may be, for example, 18 subcarriers by 6 OFDM symbols) or per sub-band (e.g., a resource block having 4 resource units). As discussed above, in order for a MS to communicate the DL CINR measurement value to the BS, the target CINR value (target sounding channel quality) may be determined based on the DL CINR measurement, e.g., based on eqn. 5:

$$CINR_{target}(\text{dB}) = 10\log\left(\frac{\text{DL\_CINR Measurement in watt}}{\alpha}\right) \quad \text{(Eqn. 5)}$$

where $\alpha$ can be a constant or a function of DL CINR value (e.g., exponential function as an example, or other function).

Figure 5:
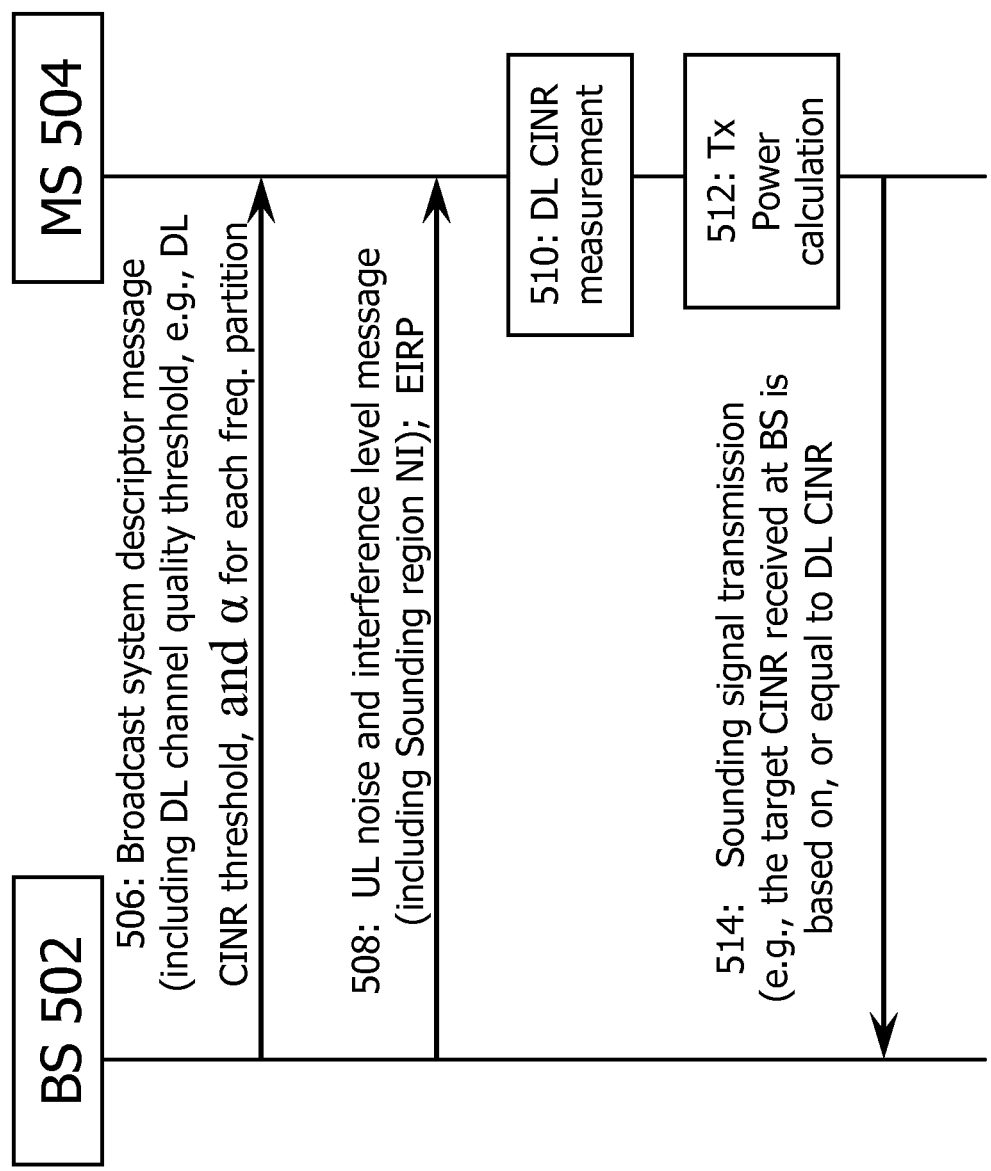
FIG. 5 is a diagram illustrating operation according to an example embodiment.

FIG. 5 is a diagram illustrating operation of a base station and mobile station according to an example embodiment. A BS 502 and a MS 504 are in communication. At 506, the BS 502 broadcasts the DL channel quality threshold, such as a CINR threshold, and the power adjustment factor ($\alpha$). Both of these values may be provided for each frequency partition.

At 508, the BS 502 may transmit the UL noise and interference (NI), and the BS radiated power, e.g., EIRP. At 510, the MS 504 measures the DL channel quality for the resource block(s), e.g., measures the SINR, CINR or SNR for each resource block. This may be performed by calculating or determining an average channel quality for the resource block. The MS 504 may compare the measured DL channel quality for each resource block to the DL channel quality threshold, and may select the resource block(s) that have a measured channel quality that is greater than or equal to the channel quality threshold.

At 512, the MS 504 may determine the transmission power for transmitting a sounding signal via each of the selected resource blocks, e.g., based on the DL channel quality threshold and the power adjustment value. This may include, for example, determining a target sounding channel quality, e.g., based on either equations 1, 2 or 5. In an example embodiment, operation 512 may be performed based on, e.g., equations 3 or 4. A different transmission power may be calculated for each selected resource block.

At 514, the MS 504 transmits a sounding signal via one or more selected resource blocks using the transmission power calculated at 512. The BS 502 may receive the sounding signal for the selected resource block(s). A sounding signal may be transmitted on one or more subcarriers of the resource block. The BS 502 may measure the channel quality of the received sounding signal. The BS 502 may determine the DL channel quality for a resource block based on the measured channel quality of the sounding signal and $\alpha$, for example. In this manner, the BS 502 may estimate the DL channel quality for each of a plurality of resource blocks, and the BS 502 may then allocate resource blocks to different MSs based on the estimated DL channel qualities. For example, where two MSs each send a sounding signal for the same resource block, the BS 502 may allocate the resource block to the MS transmitting the sounding signal with the highest amplitude, as an example, e.g., as this may indicate a higher DL channel quality for this resource block.

In addition, the BS 502 may obtain the channel information for the channel between the MS and BS for the resource block. For example, the BS 502 may receive the sounding signal and detect and phase change from the known transmitted signal, e.g., a 1. This may provide the channel state information or phase information for the UL channel, and the BS 502 may calculate the inverse phase change for the channel state information for the DL channel for the same resource block. The BS 502 may also determine the amount of attenuation for the DL channel for a resource block by determining the DL channel quality (e.g., DL CINR, SINR, SNR) for the resource block. The DL channel quality for the resource block may be estimated or determined based on the measured UL channel quality for the sounding signal for the resource block, e.g., the DL channel quality may be the same as, or some function of, the UL channel quality for the sounding signal.

Figure 6:
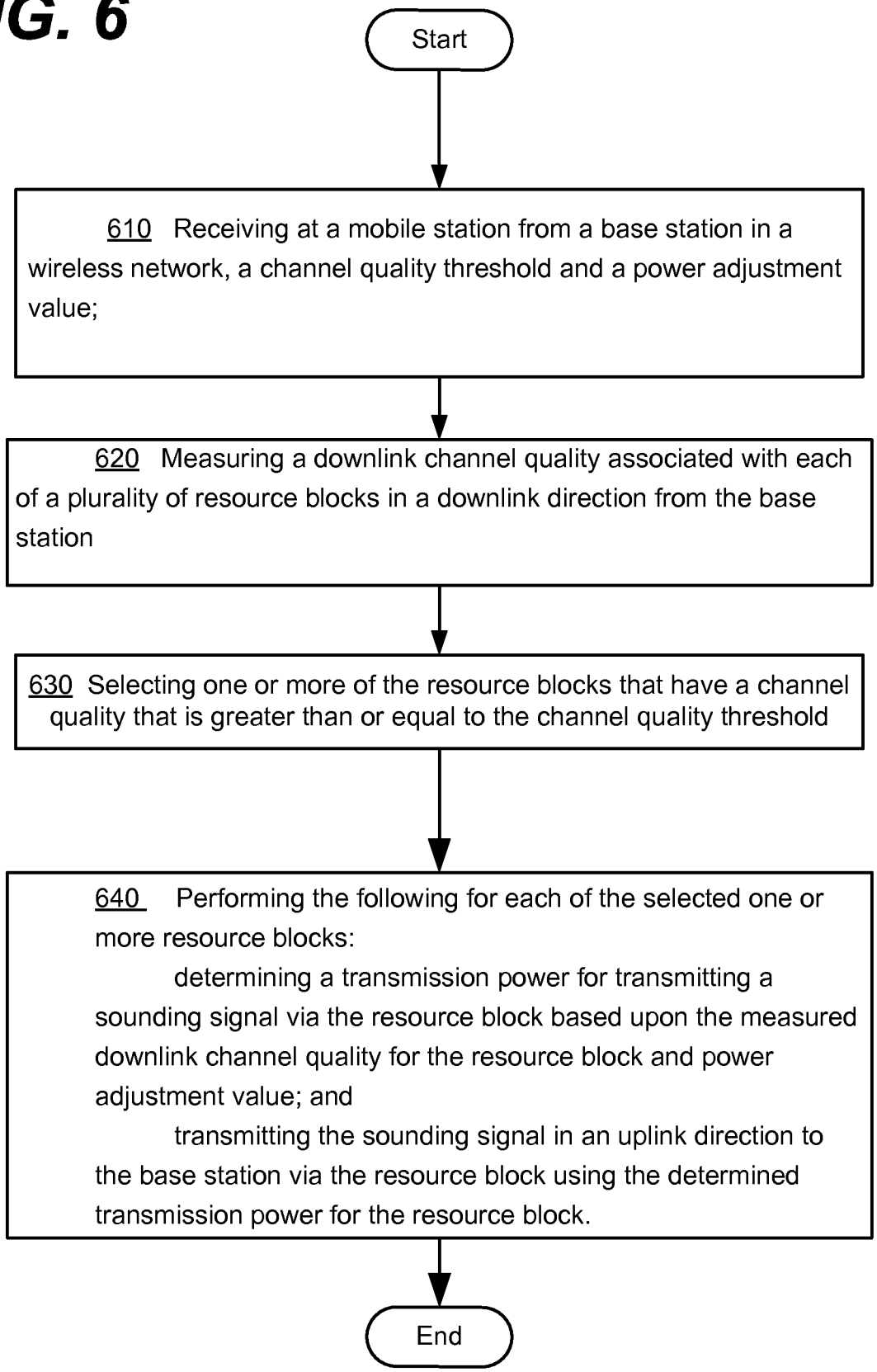
FIG. 6 is a flowchart illustrating operation of a mobile station according to an example embodiment.

FIG. 6 is a flowchart illustrating operation of a mobile station according to an example embodiment. Operation 610 may include receiving at a mobile station from a base station in a wireless network, a channel quality threshold and a power adjustment value. Operation 620 may include measuring a downlink channel quality associated with each of a plurality of resource blocks in a downlink direction from the base station. Operation 630 may include selecting one or more of the resource blocks that have a channel quality that is greater than or equal to the channel quality threshold. Operation 640 may include performing the following for each of the selected one or more resource blocks: determining a transmission power for transmitting a sounding signal via the resource block based upon the measured downlink channel quality for the resource block and power adjustment value; and transmitting the sounding signal in an uplink direction to the base station via the resource block using the determined transmission power for the resource block.

The flowchart of FIG. 6 may further include: receiving at the mobile station from the base station an uplink noise and interference level, the uplink noise and interference level being received for each of one or more frequency partitions; determining a path loss for a wireless communication path between the mobile station and the base station; and wherein the performing (640) may include performing the following for each of the selected resource blocks: determining a transmission power for transmitting a sounding signal via the resource block based upon the measured downlink channel quality for the resource block, the power adjustment value, the determined path loss, and the uplink noise and interference level; and transmitting the sounding signal in an uplink direction to the base station via the resource block using the determined transmission power for the resource block.

In operation 640, the determining a transmission power for transmitting a sounding signal via the resource block may include: determining, based on the downlink channel quality for the resource block, a target sounding channel quality to be received at the base station for the resource block based upon the measured downlink channel quality for the resource block and the power adjustment value; and determining a transmission power for transmitting a sounding signal via the resource block based upon the determined target sounding channel quality, the determined path loss, and the uplink noise and interference level.

In the flowchart of FIG. 6, the target sounding channel quality to be received at the base station for the resource block may be proportional to the measured downlink channel quality.

According to another example embodiment, an apparatus may include a processor (e.g., 204), the processor being configured to: receive at a mobile station from a base station in a wireless network, a channel quality threshold and a power adjustment value; measure a downlink channel quality associated with each of a plurality of resource blocks in a downlink direction from the base station; select one or more of the resource blocks that have a channel quality that is greater than or equal to the channel quality threshold; and perform the following for each of the selected one or more resource blocks: determine a transmission power for transmitting a sounding signal via the resource block based upon the measured downlink channel quality for the resource block and power adjustment value; and transmit, via a wireless transceiver (e.g., 202), the sounding signal in an uplink direction to the base station via the resource block using the determined transmission power for the resource block.

In an example embodiment, for each selected resource block, the transmission power for the sounding signal for the selected resource block may be determined so as to communicate to the base station the downlink channel quality for the resource block measured by the mobile station based on an uplink channel quality of the sounding signal for the resource block as measured by the base station.

In an example embodiment, the processor being configured to measure a downlink channel quality may include the processor being configured to measure an average carrier-to-interference and noise ratio (CINR) or average signal-to interference and noise level (SINR) across one or more subcarriers that are included within the resource block, wherein the channel quality threshold received from the base station includes either a CINR threshold or SINR threshold.

In an example embodiment, the processor may be further configured to: receive at the mobile station from the base station an uplink noise and interference level; determine a path loss for a wireless communication path between the mobile station and the base station; and wherein the processor being configured to perform may include the processor being configured to perform the following for each of the selected resource blocks: determine a transmission power for transmitting a sounding signal via the resource block based upon the measured downlink channel quality for the resource block, the power adjustment value, the determined path loss, and the uplink noise and interference level; and transmit, via the wireless transceiver, the sounding signal in an uplink direction to the base station via the resource block using the determined transmission power for the resource block.

In an example embodiment, the processor being configured to determine a path loss for a wireless communication path between the mobile station and the base station may include the processor being configured to: receive at the mobile station from the base station a base station radiated power level; and determine a received signal strength of either a preamble, midamble or pilot carrier received from the base station; and determine the path loss for a wireless communication path between the mobile station and the base station as the difference between base station radiated power level and the received signal strength.

In an example embodiment, the processor being configured to determine a transmission power for transmitting a sounding signal via the resource block may include the processor being configured to: determine, based on the downlink channel quality for the resource block, a target sounding channel quality to be received at the base station for the resource block based upon the measured downlink channel quality for the resource block and the power adjustment value; and determine a transmission power for transmitting a sounding signal via the resource block based upon the determined target sounding channel quality, the determined path loss, and the uplink noise and interference level.

In an example embodiment, the target sounding channel quality to be received at the base station for the resource block is selected to be the same as the measured downlink channel quality for the resource block.

In an example embodiment, the target sounding channel quality to be received at the base station for the resource block is selected based upon the measured downlink channel quality for the resource block and the power adjustment value, and wherein the target sounding channel quality to be received at the base station for the resource block is different from the measured downlink channel quality based on a power adjustment value that is either less than 1 or greater than 1.

In an example embodiment, the target sounding channel quality to be received at the base station for the resource block is proportional to the measured downlink channel quality.

In an example embodiment, the target sounding channel quality to be received at the base station may be based upon the following: $CINR_{target}$=DL CINR Measurement/$\alpha$, where $CINR_{target}$ is the target sounding channel quality to be received at the base station, DL CINR measurement is the measured downlink channel quality for the resource block, and $\alpha$ is the power adjustment value.

In an example embodiment, the sounding signal transmitted via a resource block may include a signal transmitted on at least one subcarrier of the resource block.

In an example embodiment, the processor being configured to determine the transmission power for transmitting a sounding signal via the resource block may include the processor being configured to determine the transmission power per subcarrier for the sounding signal based upon the following: $P_{TX}$=PL+$CINR_{target}$+UL NI, where $P_{TX}$ is the transmission power per subcarrier for the resource block, PL is the path loss between the mobile station and the base station, and UL NI is the uplink noise and interference level per subcarrier.

FIG. 7 is a flow chart illustrating operation of a base station according to an example embodiment. Operation 710 may include transmitting via a wireless transceiver, from a base station to one or more mobile stations a wireless network, a channel quality threshold and a power adjustment value. Operation 720 may include receiving, at the base station from a first mobile station, a sounding signal via a resource block, the presence of the sounding signal via the resource block indicating that the downlink channel quality as measured by the first mobile station is greater than or equal to the channel quality threshold. Operation 730 may include measuring an uplink channel quality of the received sounding signal for the resource block. Operation 740 may include determining a downlink channel quality for the resource block based on the measured uplink channel quality of the received sounding signal for the resource block and the power adjustment value.

According to another example embodiment, an apparatus may include a processor (e.g., 204), the processor being configured to: transmit via a wireless transceiver (e.g., 202), from a base station to one or more mobile stations a wireless network, a channel quality threshold and a power adjustment value; receive, at the base station from a first mobile station, a sounding signal via a resource block, the presence of the sounding signal via the resource block indicating that the downlink channel quality as measured by the first mobile station is greater than or equal to the channel quality threshold; measure an uplink channel quality of the received sounding signal for the resource block; and determine a downlink channel quality for the resource block based on the measured uplink channel quality of the received sounding signal for the resource block and the power adjustment value.

In an example embodiment, the downlink channel quality for the resource block may be determined based on: DL channel quality=measured UL channel quality*α, where DL channel quality is the determined downlink channel quality, the measured UL channel quality is the measured UL channel quality for the resource block as measured by the base station, and the α is the power adjustment value.

In an example embodiment, the processor being configured to transmit, receive, measure and determine may include the processor being configured to: transmit via a wireless transceiver, from a base station to one or more mobile stations a wireless network, a channel quality threshold and a power adjustment value, the channel quality threshold and the power adjustment value being provided for each of one or more frequency partitions; receive, at the base station from one or more mobile stations, a sounding signal via one or more resource blocks, the presence of the sounding signal via one of the resource blocks indicating that the downlink channel quality as measured by the transmitting mobile station is greater than or equal to the channel quality threshold; measure an uplink channel quality of each of the received sounding signals for the resource block; determine a downlink channel quality for one or more of the resource blocks with respect to each of the one or more base stations based on the measured uplink channel quality of the received sounding signal for the resource block and the power adjustment value.

In an example embodiment, the processor may be further configured to allocate the resource blocks to the mobile stations based on the determined downlink channel quality for the resource blocks.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:
1. An apparatus comprising:
at least one processor; and
at least one memory including computer program code;
the at least one memory and the computer program code configured to, with the at least one processor, cause the apparatus at least to perform:
receiving at a mobile station from a base station in a wireless network, a channel quality threshold and a power adjustment value;
measuring a downlink channel quality associated with each of a plurality of subchannels in a downlink direction from the base station;

selecting one or more of the subchannels that have a channel quality that is greater than or equal to the channel quality threshold; and performing the following for each of the selected one or more subchannels:

determining a transmission power for transmitting a sounding signal via the subchannel based upon the measured downlink channel quality for the subchannel and power adjustment value; and transmitting, via a wireless transceiver, the sounding signal in an uplink direction to the base station via the subchannel using the determined transmission power for the subchannel.

2. The apparatus of claim 1 wherein, for each selected subchannel, the transmission power for the sounding signal for the selected subchannel is determined so as to communicate to the base station the downlink channel quality for the subchannel measured by the mobile station based on an uplink channel quality of the sounding signal for the subchannel as measured by the base station.

3. The apparatus of claim 1 wherein the power adjustment value is either linear, piece-wise linear or a nonlinear function with respect to the downlink channel quality.

4. The apparatus of claim 1 wherein the measuring the downlink channel quality comprises measuring an average carrier-to-interference and noise ratio (CINR) or average signal-to interference and noise level (SINR) across one or more subcarriers that are included within the subchannel, wherein the channel quality threshold received from the base station includes either a CINR threshold or SINR threshold.

5. The apparatus of claim 1 and wherein the at least one memory and the computer program code are further configured to, with the at least one processor, cause the apparatus to:

receive at the mobile station from the base station an uplink noise and interference level; and determine a path loss for a wireless communication path between the mobile station and the base station;

wherein the determining the transmission power comprises determining the transmission power for transmitting the sounding signal via the subchannel based upon the measured downlink channel quality for the subchannel, the power adjustment value, the determined path loss, and the uplink noise and interference level.

6. The apparatus of claim 5 wherein the at least one memory and the computer program code are configured to, with the at least one processor, cause the apparatus to determine the path loss by:

receiving at the mobile station from the base station a base station radiated power level;

determining a received signal strength of either a preamble, midamble or pilot carrier received from the base station; and determining the path loss for a wireless communication path between the mobile station and the base station as the difference between base station radiated power level and the received signal strength.

7. The apparatus of claim 5 wherein the determining the transmission power for transmitting a sounding signal via the subchannel comprises:

determining, based on the downlink channel quality for the subchannel, a target sounding channel quality to be received at the base station for the subchannel based upon the measured downlink channel quality for the subchannel and the power adjustment value; and determining a transmission power for transmitting a sounding signal via the subchannel based upon the determined target sounding channel quality, the determined path loss, and the uplink noise and interference level.

8. The apparatus of claim 7 wherein the at least one memory and the computer program code are configured to, with the at least one processor, cause the apparatus to select the target sounding channel quality to be the same as the measured downlink channel quality for the subchannel.

9. The apparatus of claim 7 wherein the at least one memory and the computer program code are configured to, with the at least one processor, cause the apparatus to select the target sounding channel quality based upon the measured downlink channel quality for the subchannel and the power adjustment value, and wherein the target sounding channel quality to be received at the base station for the subchannel is different from the measured downlink channel quality based on a power adjustment value that is either less than 1 or greater than 1.

10. The apparatus of claim 7 wherein the at least one memory and the computer program code are configured to, with the at least one processor, cause the target sounding channel quality to be received at the base station for the subchannel to be proportional to the measured downlink channel quality.

11. The apparatus of claim 7 wherein the at least one memory and the computer program code are configured to, with the at least one processor, cause the target sounding channel quality to be received at the base station to be based upon the following:

$$CINR_{target} = DL\ CINR\ Measurement/\alpha,$$

where $CINR_{target}$ is the target sounding channel quality to be received at the base station, DL CINR measurement is the measured downlink channel quality for the subchannel, and $\alpha$ is the power adjustment value.

12. The apparatus of claim 7 wherein the at least one memory and the computer program code are configured to, with the at least one processor, cause the apparatus to transmit the sounding signal via a subchannel on at least one subcarrier of the subchannel.

13. The apparatus of claim 7 wherein the at least one memory and the computer program code are configured to, with the at least one processor, cause the apparatus to determine the transmission power per subcarrier for the sounding signal based upon the following:

$$P_{TX} = PL + CINR_{target} + UL\ NI,$$

where $P_{TX}$ is the transmission power per subcarrier for the subchannel, PL is the path loss between the mobile station and the base station, and UL NI is the uplink noise and interference level per subcarrier.

14. The apparatus of claim 1, wherein the subchannels include subchannels for a period of time.

15. The apparatus of claim 1, wherein the subchannels include orthogonal frequency division multiplexing (OFDM) subchannels.

16. A method comprising:

receiving, at a mobile station from a base station in a wireless network, a channel quality threshold and a power adjustment value;

measuring a downlink channel quality associated with each of a plurality of subchannels in a downlink direction from the base station;

selecting one or more of the subchannels that have a channel quality that is greater than or equal to the channel quality threshold; and performing the following for each of the selected one or more subchannels:

determining a transmission power for transmitting a sounding signal via the subchannel based upon the measured downlink channel quality for the subchannel and power adjustment value; and transmitting the sounding signal in an uplink direction to the base station via the subchannel using the determined transmission power for the subchannel.

17. The method of claim 16 wherein the determining a transmission power for transmitting a sounding signal via the subchannel comprises:

determining, based on the downlink channel quality for the subchannel, a target sounding channel quality to be received at the base station for the subchannel based upon the measured downlink channel quality for the subchannel and the power adjustment value; and determining a transmission power for transmitting a sounding signal via the subchannel based upon the determined target sounding channel quality.

18. An apparatus comprising:

at least one processor; and at least one memory including computer program code;

the at least one memory and the computer program code configured to, with the at least one processor, cause the apparatus at least to perform:

transmitting via a wireless transceiver, from a base station to one or more mobile stations in a wireless network, a channel quality threshold and a power adjustment value;

receiving, at the base station from a first mobile station, a sounding signal via a subchannel, the presence of the sounding signal via the subchannel indicating that a downlink channel quality as measured by the first mobile station is greater than or equal to the channel quality threshold;

measuring an uplink channel quality of the received sounding signal for the subchannel; and determining a downlink channel quality for the subchannel based on the measured uplink channel quality of the received sounding signal for the subchannel and the power adjustment value.

19. The apparatus of claim 18 wherein the downlink channel quality for the subchannel is determined based on: DL channel quality=measured UL channel quality $*\alpha$, where DL channel quality is the determined downlink channel quality, the measured UL channel quality is the measured UL channel quality for the subchannel as measured by the base station, and the $\alpha$ is the power adjustment value.

20. The apparatus of claim 18 wherein the at least one memory and the computer program code are configured to, with the at least one processor, cause the apparatus at least to perform:

transmitting via a wireless transceiver, from a base station to one or more mobile stations in a wireless network, a channel quality threshold and a power adjustment value, the channel quality threshold and the power adjustment value being provided for each of one or more frequency partitions;

receiving, at the base station from one or more mobile stations, a sounding signal via one or more subchannels, the presence of the sounding signal via one of the subchannels indicating that the downlink channel quality as measured by the transmitting mobile station is greater than or equal to the channel quality threshold;

measuring an uplink channel quality of each of the received sounding signals for the subchannel; and determining a downlink channel quality for one or more of the subchannels with respect to each of the one or more base stations based on the measured uplink channel quality of the received sounding signal for the subchannel and the power adjustment value.

21. The apparatus of claim 20 wherein the at least one memory and the computer program code are further configured to, with the at least one processor, cause the apparatus at least to allocate the subchannels to the mobile stations based on the determined downlink channel quality for the subchannels.

22. A method comprising:

transmitting via a wireless transceiver, from a base station to one or more mobile stations in a wireless network, a channel quality threshold and a power adjustment value;

receiving, at the base station from a first mobile station, a sounding signal via a subchannel, the presence of the sounding signal via the subchannel indicating that the downlink channel quality as measured by the first mobile station is greater than or equal to the channel quality threshold;

measuring an uplink channel quality of the received sounding signal for the subchannel; and determining a downlink channel quality for the subchannel based on the measured uplink channel quality of the received sounding signal for the subchannel and the power adjustment value.

* * * * *